Feb. 26, 1935. — R. S. BLEY — 1,992,895
PROCESS OF PRODUCING HYDROGEN SULPHIDE
Filed Nov. 16, 1933
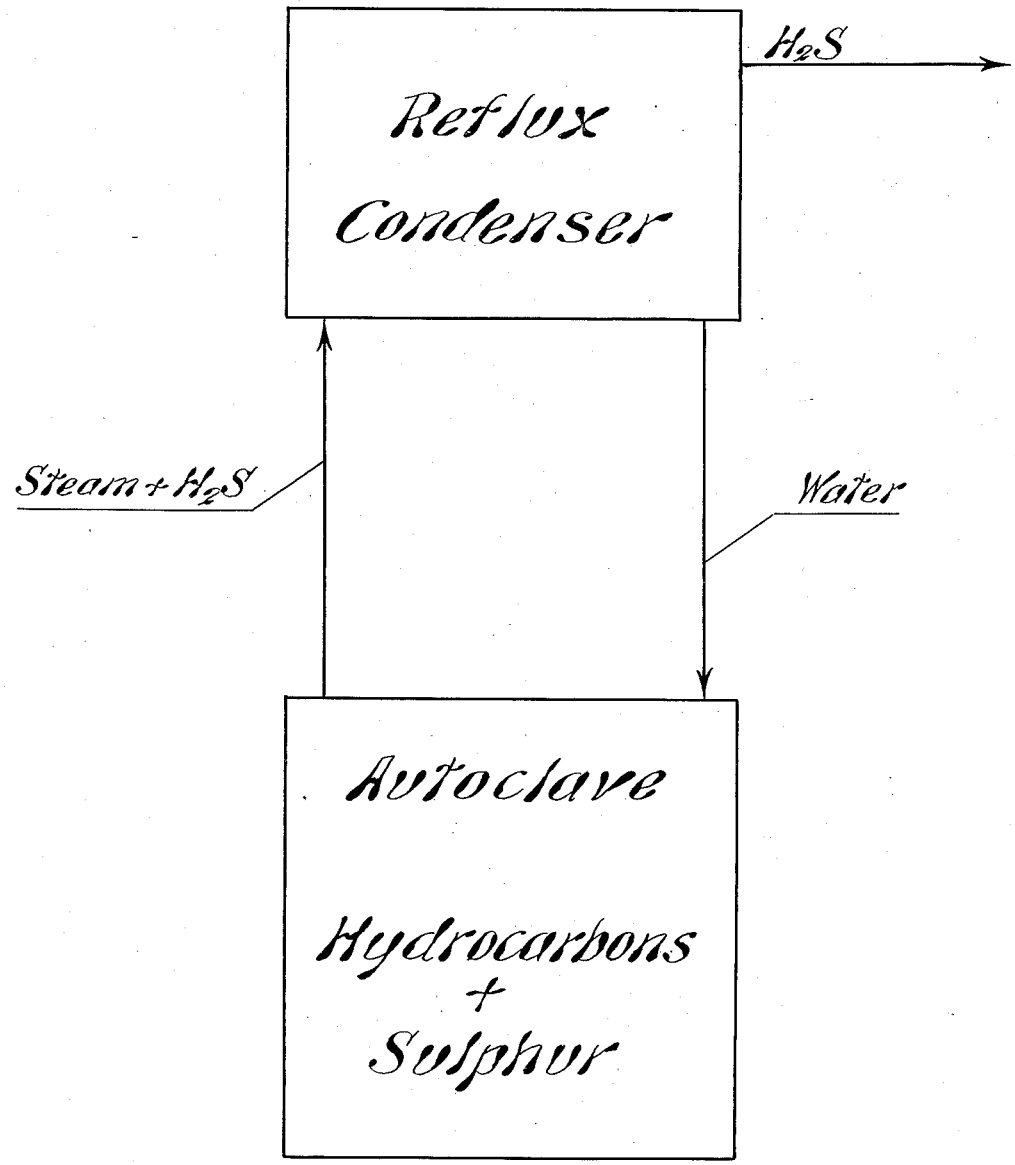

Patented Feb. 26, 1935

1,992,895

UNITED STATES PATENT OFFICE 1,992,895

PROCESS OF PRODUCING HYDROGEN SULPHIDE

Rudolph S. Bley, Elizabethton, Tenn., assignor to North American Rayon Corporation, New York, N. Y., a corporation of Delaware Application November 16, 1933, Serial No. 698,237

16 Claims. (Cl. 23—181)

The present invention relates to a process of producing hydrogen sulphide of great purity for the manufacture of alkali metal sulphides which are generally used for desulphurizing viscose yarns and the like.

One object of my invention is to economically produce hydrogen sulphide on a large scale from cheap vegetable or mineral oils and sulphur.

Another object of my present invention is to use artificial silk waste in combination with vegetable or mineral oils, fats, etc. and sulphur, for the manufacture of hydrogen sulphide.

A third object of this invention is to produce substantially pure, liquid hydrogen sulphide from oils without further mechanical compression.

I am well aware that it has, heretofore been proposed to produce hydrogen sulphide by boiling sulphur together with alkalies under pressure, and to develop this gas by heating oils, especially hydrocarbon oils, together with sulphur under normal atmospheric pressures. It has been found, however, that this latter process fails to yield sufficient volumes of gas, and, furthermore, that the raw materials used in this process, in view of the aforementioned poor yields of hydrogen sulphide, become too expensive for commercial purposes.

I have found by experimentation that very high yields of hydrogen sulphide are realized when vegetable or mineral oils are heated under superatmospheric pressures with sulphur in the presence or absence of additional water. Any type of oil or fat, such as vegetable oils and fats, animal oils and fats, mineral oils, hydrocarbon oils, for example, tar oil, Mexican crude oil, petroleum oil, paraffin oil, asphalt, solid paraffin, etc., may be treated with sulphur under pressure to yield hydrogen sulphide. My novel process is especially suitable for the production of this compound from rayon waste, viz. viscose silk, cuprammonium silk, cellulose esters, cellulose ethers, etc., in combination with vegetable or mineral oils and sulphur. It is to be noted that suitable catalysts, such as metallic oxides, etc., may be added to the reacting mass in order to promote its decomposition and to simultaneously accelerate the union of the final compounds obtained by destructive distillation of a carbohydrate-sulphur mixture under pressure.

The residual copper compounds present in copper silk waste represent, per se, valuable catalytic agents, and thus, additional agents to catalize the process may be dispensed with.

The attached drawing represents a diagrammatic view of the manner in which my process may be carried out.

It will be noted that I have disclosed, diagrammatically, the manner in which hydrocarbons and sulphur may be heated in an autoclave, the passage of a stream of hydrogen sulphide to the reflux condenser, the passage of the hydrogen sulphide from the condenser, and the return of water and intermediate decomposition products to the autoclave. Since my present invention comprehends only the process for producing the hydrogen sulphide, I have not depicted, specifically, any particular apparatus. Any suitable commercial autoclave and condenser may be employed.

Vegetable and/or mineral oils, for example, and sulphur, are charged into an autoclave of hydrogen sulphide resisting material, said autoclave being provided with a pressure gage, safety valve and suitable stirring means. Water, as set forth above, may be added to the oil-sulphur mass to form a thin paste which can be readily stirred. This autoclave is connected with a reflux condenser of conventional type, the same being provided with adequate cooling means, and an outlet for the hydrogen sulphide formed during the reaction. The autoclave is slowly heated by suitable means, i. e. steam coils, etc., under continuous stirring, to pressures preferably ranging from 5 to 30 atmospheres, although it is to be noted that the process may be carried out under lower or higher pressures. If the pressures, and consequently the temperatures, are raised above the liquefaction pressure of hydrogen sulphide and the reflux condenser maintained at relatively low temperatures, hydrogen sulphide can be produced in liquid form without additional mechanical compression. The hydrogen sulphide obtained may be purified by any well known means, such as absorbing substances, etc., and/or sodium sulphide may be produced by causing hydrogen sulphide to react with sodium sulphate, etc. Instead of using mineral or vegetable oils with sulphur, the autoclave may be charged with a mixture of oils and carbohydrates, such as waste artificial silk, etc. The amounts of sulphur and oil necessary for the production of hydrogen sulphide depend upon the type of oil as well as the grade of sulphur used in the reaction. They must be individually determined by experimentation, although it is to be noted that an excess of either one of these substances does not adversely affect the reaction itself. For reasons of economy an excess of sulphur and oil should be avoided.

It is to be noted that my process is especially adapted for the production of hydrogen sulphide from cellulose sludge present in the waste water of rayon plants and paper mills. This fermented or still fermenting sludge contains large amounts of sulphur compounds and cellulose in a finely dispersed state which readily break up into hydrogen sulphide on being heated under pressure in the presence of additional sulphur. Thus, the decomposition of carbohydrates by means of sulphur under pressure may be accelerated by adding thereto such cellulose sludge. Waste viscose solutions may be also used in place of cellulose sludge to speed up the formation of hydrogen sulphide.

I wish to point out that the compounds as well as the pressures, set forth above, are merely illustrative and may be varied without departing from the scope and spirit of my invention. No limitations should be imposed upon my invention except as indicated in the appended claims.

I claim:

1. The process of producing hydrogen sulphide comprising heating a substance of the group consisting of mineral oils, vegetable oils, animal oils, vegetable fats, animal fats and paraffin, and waste rayon of cellulosic origin under a superatmospheric pressure in the presence of sulphur.

2. The process of producing hydrogen sulphide comprising heating a substance of the group consisting of mineral oils, vegetable oils, animal oils, vegetable fats, animal fats and paraffin, and waste rayon of cellulosic origin under pressures of about 5 to 30 atmospheres in the presence of sulphur.

3. The process of producing hydrogen sulphide comprising heating waste rayon of cellulosic origin under a superatmospheric pressure in the presence of sulphur, a catalyst and a substance of the group consisting of mineral oils, vegetable oils, animal oils, vegetable fats, animal fats and paraffin.

4. The process of producing hydrogen sulphide comprising heating waste rayon of cellulosic origin under a superatmospheric pressure in the presence of sulphur, water, a catalyst and a substance of the group consisting of mineral oils, vegetable oils, animal oils, vegetable fats, animal fats and paraffin.

5. The process of producing hydrogen sulphide comprising heating waste rayon of cellulosic origin under a superatmospheric pressure in the presence of sulphur, a substance of the group consisting of mineral oils, vegetable oils, animal oils, vegetable fats, animal fats, and paraffin and an accelerator of the group consisting of cellulose sludge and waste viscose solutions.

6. The process of producing hydrogen sulphide comprising heating waste rayon of cellulosic origin under pressures of about 5 to 30 atmospheres in the presence of sulphur, a catalyst and a substance of the group consisting of mineral oils, vegetable oils, animal oils, vegetable fats, animal fats and paraffin.

7. The process of producing hydrogen sulphide comprising heating waste rayon of cellulosic origin under pressures of about 5 to 30 atmospheres in the presence of sulphur, a catalyst, water and a substance of the group consisting of mineral oils, vegetable oils, animal oils, vegetable fats, animal fats and paraffin.

8. The process of producing hydrogen sulphide comprising heating waste rayon of cellulosic origin under pressures of about 5 to 30 atmospheres in the presence of sulphur, a substance of the group consisting of mineral oils, vegetable oils, animal oils, vegetable fats, animal fats and paraffin and an accelerator of the group consisting of cellulose sludge and waste viscose solutions.

9. The process of producing hydrogen sulphide comprising heating waste rayon of the group consisting of viscose and cuprammonium cellulose under a superatmospheric pressure in the presence of sulphur and a substance of the group consisting of mineral oils, vegetable oils, animal oils, vegetable fats, animal fats and paraffin.

10. The process of producing hydrogen sulphide comprising heating waste rayon of the group consisting of viscose and cuprammonium cellulose under a superatmospheric pressure in the presence of sulphur, a catalyst and a substance of the group consisting of mineral oils, vegetable oils, animal oils, vegetable fats, and paraffin.

11. The process of producing hydrogen sulphide comprising heating waste rayon of the group consisting of viscose and cuprammonium cellulose under a superatmospheric pressure in the presence of sulphur, water, a catalyst and a substance of the group consisting of mineral oils, vegetable oils, animal oils, vegetable fats, and paraffin.

12. The process of producing hydrogen sulphide comprising heating waste rayon of the group consisting of viscose and cuprammonium cellulose under a superatmospheric pressure in the presence of sulphur, a substance of the group consisting of mineral oils, vegetable oils, animal oils, vegetable fats, and paraffin and an accelerator of the group consisting of cellulose sludge and waste viscose solutions.

13. The process of producing hydrogen sulphide comprising heating waste rayon of the group consisting of viscose and cuprammonium cellulose under pressures of about 5 to 30 atmospheres in the presence of sulphur and a substance of the group consisting of mineral oils, vegetable oils, animal oils, vegetable fats, and paraffin.

14. The process of producing hydrogen sulphide comprising heating waste rayon of the group consisting of viscose and cuprammonium cellulose under pressures of about 5 to 30 atmospheres in the presence of sulphur, a catalyst and a substance of the group consisting of mineral oils, vegetable oils, animal oils, vegetable fats, and paraffin.

15. The process of producing hydrogen sulphide comprising heating waste rayon of the group consisting of viscose and cuprammonium cellulose under pressures of about 5 to 30 atmospheres in the presence of sulphur, water, a catalyst and a substance of the group consisting of mineral oils, vegetable oils, animal oils, vegetable fats, and paraffin.

16. The process of producing hydrogen sulphide comprising heating waste rayon of the group consisting of viscose and cuprammonium cellulose under pressures of about 5 to 30 atmospheres in the presence of sulphur, a substance of the group consisting of mineral oils, vegetable oils, animal oils, vegetable fats, and paraffin and an accelerator of the group consisting of cellulose sludge and waste viscose solutions.

RUDOLPH S. BLEY.